United States Patent
Nakabayashi et al.

(10) Patent No.: US 10,578,711 B2
(45) Date of Patent: Mar. 3, 2020

(54) RADAR APPARATUS, RADAR OUTPUT CONTROL SYSTEM, AND RADAR OUTPUT CONTROL METHOD

(71) Applicant: DENSO CORPORATION, Kariya, Aichi-pref. (JP)

(72) Inventors: Kento Nakabayashi, Kariya (JP); Asahi Kondo, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 286 days.

(21) Appl. No.: 15/529,377

(22) PCT Filed: Sep. 28, 2015

(86) PCT No.: PCT/JP2015/077281
§ 371 (c)(1),
(2) Date: May 24, 2017

(87) PCT Pub. No.: WO2016/084468
PCT Pub. Date: Jun. 2, 2016

(65) Prior Publication Data
US 2018/0113197 A1 Apr. 26, 2018

(30) Foreign Application Priority Data
Nov. 26, 2014 (JP) ................. 2014-238717

(51) Int. Cl.
*G01S 7/40* (2006.01)
(52) U.S. Cl.
CPC ..... *G01S 7/4008* (2013.01); *G01S 2007/4013* (2013.01)

(58) Field of Classification Search
CPC .............. G01S 7/4008; G01S 2007/4013
(Continued)

(56) References Cited

U.S. PATENT DOCUMENTS 5,124,708 A * 6/1992 Mackes ................ G01S 7/4008
342/174
5,262,787 A * 11/1993 Wilson ................. G01S 7/4052
342/172
(Continued)

FOREIGN PATENT DOCUMENTS

JP 4429347 B2 12/2009

OTHER PUBLICATIONS

Anonymous, How to Bias an Op-Amp, Massachusetts Institute of Technology, Spring 2011 (Year: 2011).*

*Primary Examiner* — Frank J McGue
(74) *Attorney, Agent, or Firm* — Knobbe, Martens, Olson & Bear, LLP

(57) ABSTRACT

A radar apparatus transmits a radar wave, with a control parameter being set to a desired value, and acquires an initial transmission level from outside the radar apparatus, the initial transmission level being a result of measurement of a transmission level of the radar wave. At the same time, the radar apparatus receives a delayed wave of the radar wave from outside the radar apparatus, and acquires an initial reception level which is a result of measurement of a reception level of the delayed wave. The radar apparatus then sets a target reception level according to a preset target transmission level, and the initial transmission level and the initial reception level acquired. The radar apparatus then repeats update of the control parameter and measurement of the reception level until the reception level coincides with the target reception level.

9 Claims, 5 Drawing Sheets

(58) Field of Classification Search
USPC .................................................. 342/174, 82
See application file for complete search history.

(56) References Cited

U.S. PATENT DOCUMENTS 8,325,084 B2 * 12/2012 Walker .................... G01S 7/025
342/174
8,692,707 B2 * 4/2014 Lee ........................ G01S 7/4026
342/141

* cited by examiner

RADAR APPARATUS, RADAR OUTPUT CONTROL SYSTEM, AND RADAR OUTPUT CONTROL METHOD

CROSS-REFERENCE TO RELATED APPLICATION

This application is based on and claims the benefit of priority from earlier Japanese Patent Application No. 2014-238717 filed on Nov. 26, 2014 the descriptions of which is incorporated herein by reference.

TECHNICAL FIELD

The present disclosure relates to a technology of controlling transmission power of a radar apparatus.

BACKGROUND ART

A method as set forth below has been known as a method of controlling a transmission level of a radar apparatus on a pre-shipment inspection line.

In a conventional method, a radar wave transmitted from a radar apparatus is initially received by a receiving antenna disposed near the radar apparatus, and the reception level is measured by a power meter or the like. The measurement result of the power meter is retrieved by a personal computer (PC), for supply to the radar apparatus via the PC. As a result of the supply, the radar apparatus changes a control parameter used for changing an output of the radar wave, such that the measurement result of the transmission level acquired from the PC coincides with a preset target transmission level (see PTL 1).

CITATION LIST

Patent Literature

[PTL 1] JP 4429347 B

SUMMARY OF THE INVENTION

Technical Problem

In the conventional art, the radar apparatus needs to acquire the results of measurements of a transmission level from an external PC every time the apparatus changes a control parameter. In other words, the radar apparatus has suffered from a problem of having to communicate with the PC every time the apparatus changes a control parameter, and of requiring a long time for controlling the transmission level.

The present disclosure has an object of providing a technique of reducing time taken for controlling transmission power of a radar apparatus.

Solution to Problem

A radar apparatus in the present disclosure includes an initial measurement means, a target setting means, and a control means. The initial measurement means transmits the radar wave, with a control parameter for use in changing an output of the radar wave being set to a predetermined value, acquires an initial transmission level from a measurement device that is provided outside the radar apparatus and measures the radar wave, the initial transmission level being a result of measurement of a transmission level of the radar wave. In addition, the initial measurement means receives a delayed wave of the radar wave from a delay device that is provided outside the radar apparatus and delays the radar wave to send back the delayed radar wave, and acquires an initial reception level, which is a result of measurement of a reception level of the delayed wave. The target setting means sets a target reception level according to a preset target transmission level, and the initial transmission level and the initial reception level acquired by the initial measurement means. The control means repeats update of the control parameter and measurement of the reception level until the reception level coincides with the target reception level.

According to such a configuration, the radar apparatus of the present disclosure needs to conduct communication only once initially for acquiring the result of measurement from the measurement device, and hence can reduce the time taken for controlling the transmission level.

Moreover, a radar output control system of the present disclosure includes the radar apparatus described above, a receiving antenna, a measurement device, and a delay device. The receiving antenna receives a radar wave outputted from the radar apparatus. The measurement device measures a reception level of the receiving antenna and transmits a result of measurement to the radar apparatus. The delay device delays the radar wave outputted from the radar apparatus and sends the delayed radar wave back to the radar apparatus, for reception by the radar apparatus.

It should be noted that the delay device may be served by a reflector. Alternatively, the delay device may have a configuration in which a signal that has been received by the receiving antenna is delayed by using a delay line, and then the delayed signal is re-radiated toward the radar apparatus using the transmitting antenna.

Use of a reflector can simplify the configuration of the radar output control system. Use of a delay line enables control of the transmission level of the radar apparatus in a smaller space compared with the case of using a reflector.

It should be noted that each bracketed reference sign in the claims shows correspondency with a specific means described in each embodiment described below as a mode, and thus should not be construed as limiting the technical scope of the present disclosure.

DESCRIPTION OF THE EMBODIMENTS

With reference to the drawings, hereinafter will be described embodiments of the present disclosure.

First Embodiment

[Configuration]

Figure 1:
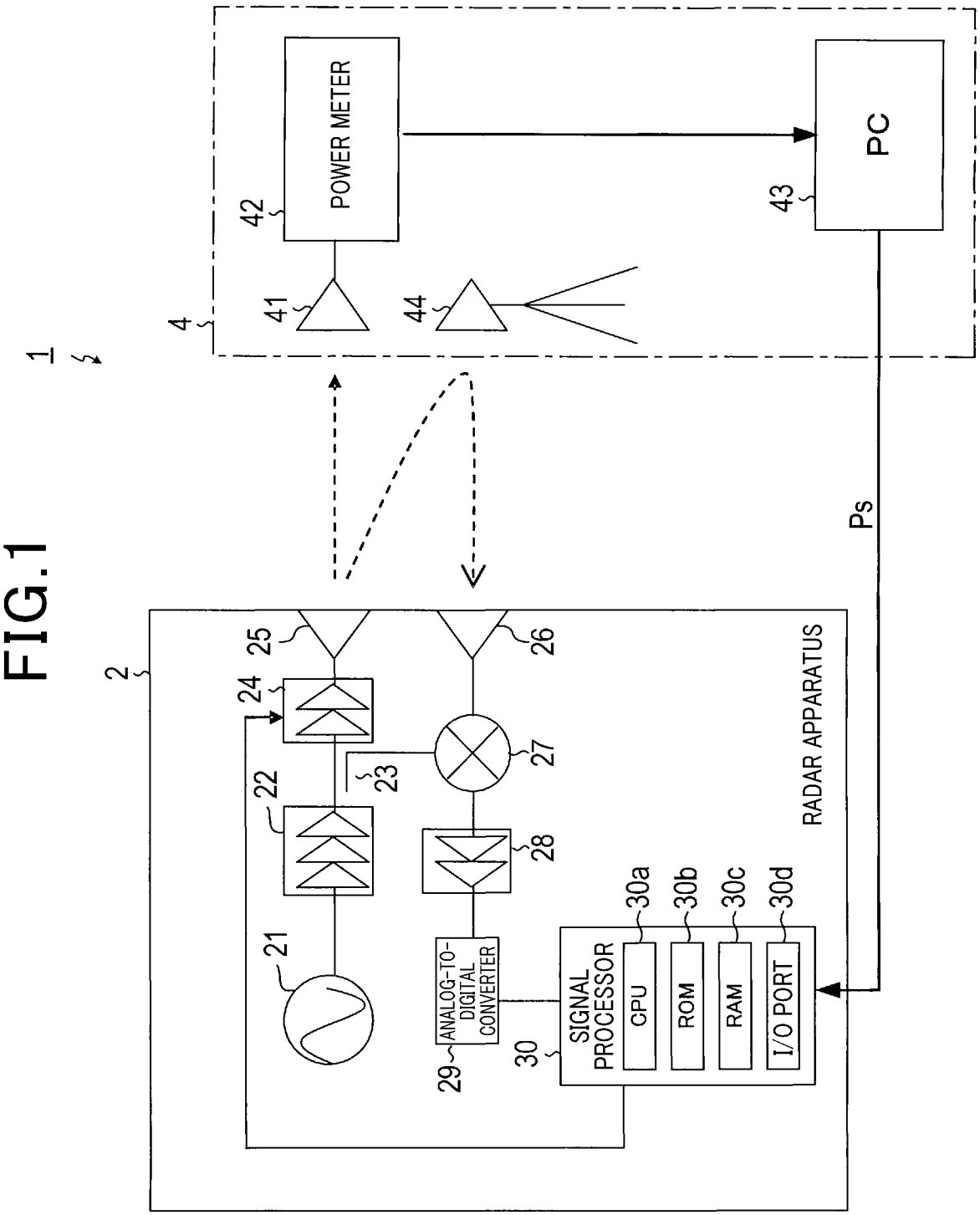
FIG. 1 is a block diagram illustrating a configuration of a radar output control system, according to a first embodiment.

As shown in FIG. 1, a radar output control system 1 according to the present embodiment includes a radar apparatus 2 that is a target to be controlled, and an external unit system 4 provided separately from the radar apparatus 2.

External Unit System

The external unit system 4 according to the present embodiment includes a receiving antenna 41, a power meter 42, a PC (personal computer) 43, and a reflector 44.

The receiving antenna 41 is positioned facing the radar apparatus 2 to receive a radar wave outputted from the radar apparatus 2. It is desirable that the distance between the receiving antenna 41 and the radar apparatus 2 is as small as possible, and is set to 1 m or less, for example.

The power meter 42 measures a reception level (reception power herein) of the radar wave received by the receiving antenna 41, according to a received signal from the receiving antenna 41. This is the way the power meter 42 measures a transmission level (transmission power herein) of the radar wave outputted from the radar apparatus 2.

The PC 43 acquires the measurement result of the power meter 42, and transmits the measurement result to the radar apparatus 2. In other words, the PC 43 transmits a transmission level Ps of the radar wave to the radar apparatus 2 that has outputted the radar wave.

The reflector 44 is disposed at a position facing the radar apparatus 2, and causes the radar wave outputted from the radar apparatus 2 to be reflected off the radar apparatus 2. The distance between the radar apparatus 2 and the reflector 44 is set to 5 m or more, for example, so that a frequency component of a reflected wave acquired by a frequency analysis process, described below, is not affected by a DC noise. The DC noise refers to a signal component that directly wraps around from a transmitting antenna 25 to a receiving antenna 26 of the radar apparatus 2, or a signal component that directly wraps around similarly in a circuit of the radar apparatus 2.

Radar Apparatus

The radar apparatus 2 according to the present embodiment includes an oscillator 21, an amplifier 22, a branching filter 23, a power amplifier 24, the transmitting antenna 25, the receiving antenna 26, a mixer 27, an amplifier 28, an analog-to-digital converter 29, and a signal processor 30.

The oscillator 21 generates a high frequency signal. The oscillator 21 herein generates an FMCW wave, a frequency of which linearly changes as does a triangle wave. In the present embodiment, a signal having an extremely high frequency band is used as the high frequency signal, but is not limited thereto.

The amplifier 22 amplifies the high frequency signal generated by the oscillator 21.

The branching filter 23 divides power of an output of the amplifier 22, for supply to the power amplifier 24 and the mixer 27.

The power amplifier 24 amplifies a signal supplied from the branching filter 23. The power amplifier 24 can change a control parameter according to a control signal derived from the signal processor 30 to change an amplification factor. With the change of the amplification factor, the transmission level of the radar wave outputted from the transmitting antenna 25 can be changed. In the present embodiment, a bias voltage applied to a circuit associated with amplification is used as the control parameter. As the control parameter has a larger value, the power amplifier 24 should have a larger amplification factor. In other words, as the control parameter has a larger value, the transmission level of the radar wave should become higher.

The transmitting antenna 25 converts a transmission signal supplied from the power amplifier 24 into a radar wave that is a radio wave having an extremely high frequency band.

The receiving antenna 26 receives the radio wave having an extremely high frequency band and arriving from a direction along which the radar wave has been radiated by the transmitting antenna 25.

The mixer 27 mixes a received signal from the receiving antenna 26 with a local signal from the branching filter 23 to generate a beat signal formed of a component corresponding to a frequency difference between the received signal and the local signal.

The amplifier 28 amplifies the beat signal generated by the mixer 27.

The analog-to-digital converter 29 samples the amplified beat signal, which has been outputted from the amplifier 28, at a predetermined sampling interval, for conversion into a digital value to thereby generate reception data.

The signal processor 30 includes a microcomputer made up of a CPU 30a, a ROM 30b, and a RAM 30c, and further includes an I/O port 30d that enables data communication with the external PC 43. The signal processor 30 executes at least a target object detection process and an output control process, on the basis of the reception data generated by the analog-to-digital converter 29.

The target object detection process is a well-known process of obtaining information on a target object that has reflected the radar wave, on the basis of the reception data, and hence the description will be omitted.

The output control process according to the present embodiment will hereinafter be described in detail.

[Output Control Process]

The output control process according to the present embodiment is executed in a state where the external unit system 4 is installed to enable transmission/reception of a radar wave to/from the radar apparatus 2, and the signal processor 30 and the PC 43 are connected to enable communication therebetween. The present process is started in signal processor 30 by a startup command being inputted from the PC 43, for example.

Figure 2:
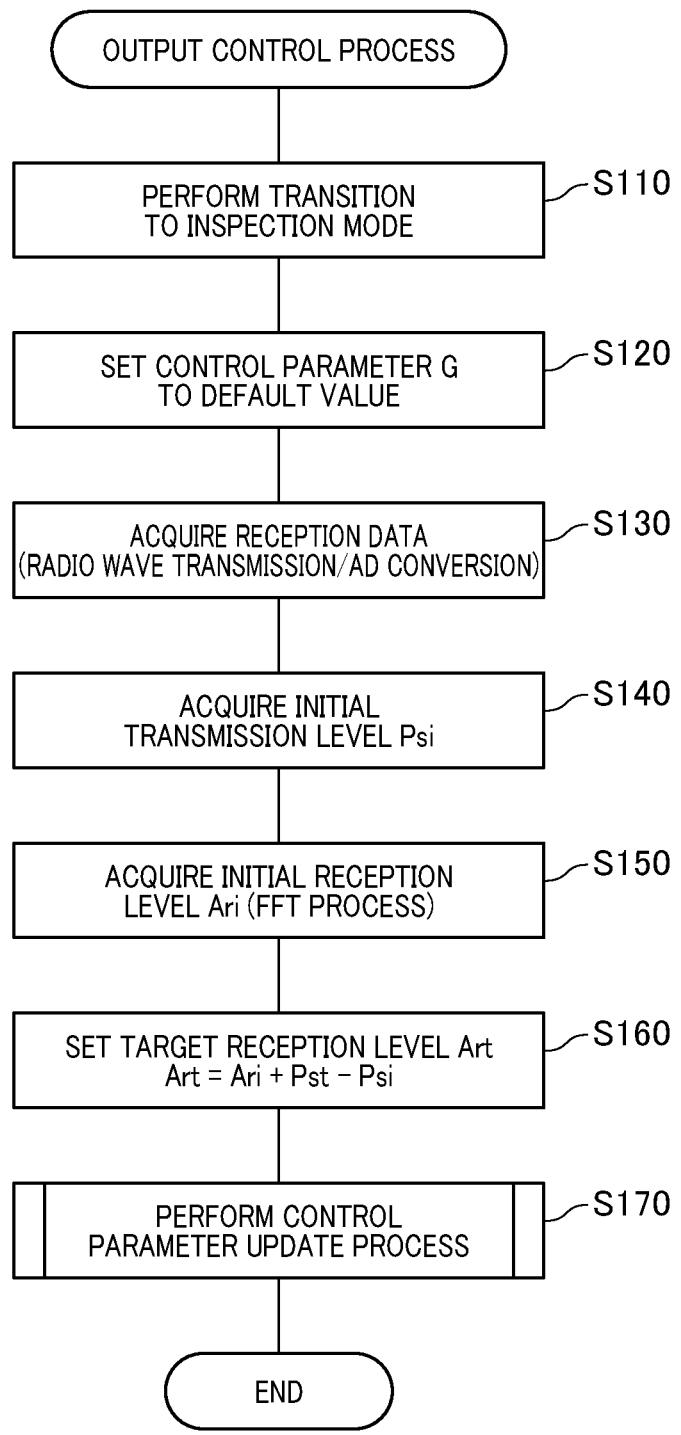
FIG. 2 is a flowchart illustrating an output control process executed by a signal processor of a radar apparatus.

As shown in FIG. 2, when the present process is started in the signal processor 30, the CPU 30a initially transitions, at S110, to an inspection mode of enabling control of the control parameter of the power amplifier 24.

At the subsequent S120, a control parameter G is set to a default value. As the default value, for example, an intermediate value of a value range of the control parameter G is used. However, the default value is not limited to the intermediate value, but an upper limit, a lower limit, or the like of the value range of the control parameter may also be used.

At the subsequent S130, the CPU 30a acquires the reception data that has been AD-converted by the analog-to-digital converter 29. More specifically, in the radar apparatus 2, the transmitting antenna 25 transmits a radio wave, the receiving antenna 26 receives a reflected wave from the reflector 44, and the analog-to-digital converter 29 AD-converts the received signal. The CPU 30a acquires the reception data that has been AD-converted in this way.

At the subsequent S140, a result of measurement in the power meter 42 is acquired from the PC 43 of the external unit system 4. More specifically, in the external unit system 4, the radio wave transmitted from the radar apparatus 2 is received by the receiving antenna 41, and the transmission level of the received radio wave is measured by the power meter 42, and a result of the measurement is transmitted by the PC 43 to the radar apparatus 2. The CPU 30a acquires the transmitted result of the measurement via the I/O port 30d. The result of measurement is hereinafter referred to as an initial transmission level Psi. This is the way the CPU 30a acquires the initial transmission level Psi.

At the subsequent S150, the CPU 30a uses the reception data acquired at S130 to execute the frequency analysis process, and calculates a frequency spectrum. Specifically, a fast Fourier transform (FFT) process is executed herein as the frequency analysis process.

Figure 3:
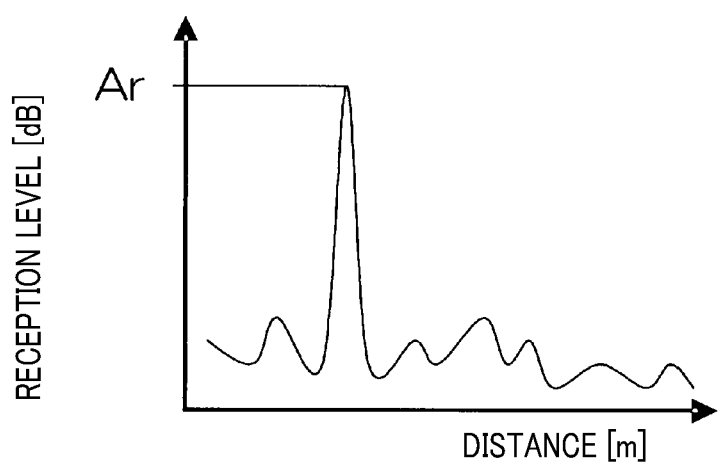
FIG. 3 is an explanatory diagram illustrating a relationship between FFT processing result and reception level.

Next, the CPU 30a extracts, from the calculated frequency spectrum, a peak frequency component that represents the reflected wave from the reflector 44, and calculates its reception intensity, namely, its reception level (see FIG. 3). This reception level is hereinafter referred to as an initial reception level Ari. This is the way the CPU 30a acquires the initial reception level Ari.

At the subsequent S160, the CPU 30a calculates and sets a target reception level Art, according to Expression (1) that uses a preset target transmission level Pst, the initial transmission level Psi acquired at S140, and the initial reception level Ari acquired at S150. It should be noted that the levels are each expressed in decibel values.

$$Art = Ari + Pst - Psi \quad (1)$$

More specifically, a deviation of the initial transmission level Psi relative to the target transmission level Pst is added to the initial reception level Ari, and the resultant value is set as a value of the target reception level Art.

At the subsequent S170, the CPU 30a repeatedly transmits a radar wave and executes the control parameter update process of updating the control parameter such that the reception level of the reflected wave coincides with the target reception level Art set at S160, and terminates the present process.

Figure 4:
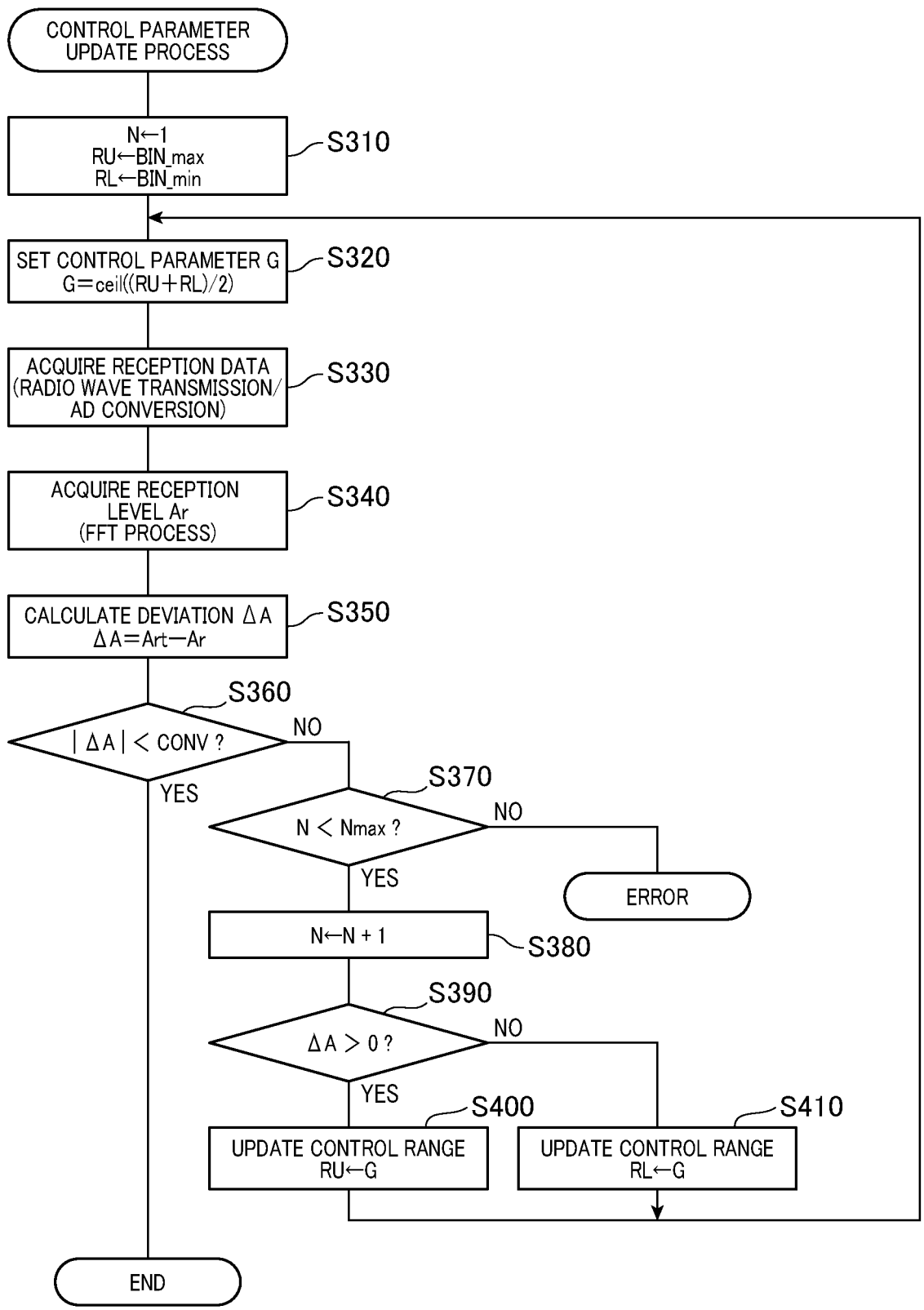
FIG. 4 is a flowchart illustrating details of a control parameter update process.

Next, referring to the flowchart of FIG. 4, details of the control parameter update process of the present embodiment will be described. This process uses a technique of binary search, which is a kind of retrieval algorithm, to determine a value of the control parameter G.

Initially at S310, the CPU 30a initializes a parameter N, which represents the number of times the process is repeated, to 1, while also initializing an upper limit RU and a lower limit RL of a control range for use in determining the control parameter G. The upper limit RU of the control range is set to BIN_max, which is an upper limit of the value range of the control parameter G, and the lower limit RL of the control range is set to BIN_min, which is a lower limit of the value range of the control parameter G.

At the subsequent S320, the CPU 30a calculates and sets the control parameter G, according to Expression (2) that uses the upper limit RU and the lower limit RL of the control range.

$$G = \text{ceil}((RU + RL)/2) \quad (2)$$

In Expression (2), ceil represents a function that returns a value obtained by rounding up the value after the decimal point. The CPU 30a sets an intermediate value of the control range, calculated according to Expression (2), as an initial value of the control parameter G.

At the subsequent S330, similarly to S130 of FIG. 2, the CPU 30a transmits a radio wave from the transmitting antenna 25, receives a wave reflected from the reflector 44 using the receiving antenna 26, AD-converts the received signal using the analog-to-digital converter 29, and acquires the AD-converted reception data.

At the subsequent S340, similarly to S150 of FIG. 2, the CPU 30a executes a fast Fourier transform (FFT) process and acquires a reception level Ar of the wave reflected from the reflector 44.

At the subsequent S350, the CPU 30a calculates a deviation $\Delta A$ of the reception level Ar relative to the target reception level Art.

At the subsequent S360, it is determined whether an absolute value of the deviation $\Delta A$ is smaller than a preset allowable value CONV. As a result, if the absolute value of the deviation $\Delta A$ is determined to be smaller than the allowable value CONV (YES at S360), the reception level Ar is regarded to coincide with the target reception level Art, and the present process is terminated.

On the other hand, if the CPU 30a determines that the absolute value of the deviation $\Delta A$ is equal to or larger than the allowable value CONV (NO at S360), control proceeds to S370 where it is determined whether the parameter N is smaller than an upper limit Nmax. It should be noted that Nmax is set to a value satisfying $2Nmax-1 < 2 \leq Nmax$, where K is the number of stages, i.e. a value that can be set in the value range of the control parameter G.

As a result, if the CPU 30a determines that the parameter N is equal to or larger than the upper limit Nmax (NO at S370), an error is determined to have occurred, and the present process is terminated. In this case, an error handling process is separately executed. On the other hand, if the CPU 30a determines that the parameter N is smaller than the upper limit Nmax (YES at S370), control proceeds to S380 and the parameter N is incremented (N←N+1), and then control proceeds to S390.

At S390, the CPU 30a determines whether the deviation $\Delta A$ is larger than 0, namely, whether the reception level Ar is larger than the target reception level Art.

As a result, if it is determined that the deviation $\Delta A$ is larger than 0 (YES at S390), control proceeds to S400. At S400, taking the control parameter G as needing to be decreased so that the reception level Ar coincides with the target reception level Art, the upper limit RU of the control range is updated with the control parameter G, and control returns to S320.

On the other hand, if the CPU 30a determines that the deviation $\Delta A$ is equal to or smaller than 0 (NO at S390), control proceeds to S410. At S410, taking the control parameter G as needing to be increased so that the reception level Ar coincides with the target reception level Art, the lower limit RL of the control range is updated with the control parameter G, and control returns to S320.

Advantageous Effects

As described above, the radar apparatus 2 according to the present embodiment does not need to conduct communication for acquiring a result of measurement from the external unit system 4 every time the control parameter G is changed, but needs to conduct communication only once initially. Therefore, the time taken for controlling the transmission level of the radar wave can be reduced.

Moreover, in the radar apparatus 2 according to the present embodiment, the control parameter G is updated by binary search. Therefore, control is efficiently performed.

Second Embodiment

In a second embodiment, the basic configuration is similar to that of the first embodiment, and hence description on the common configuration is omitted to focus description on differences.

Figure 5:
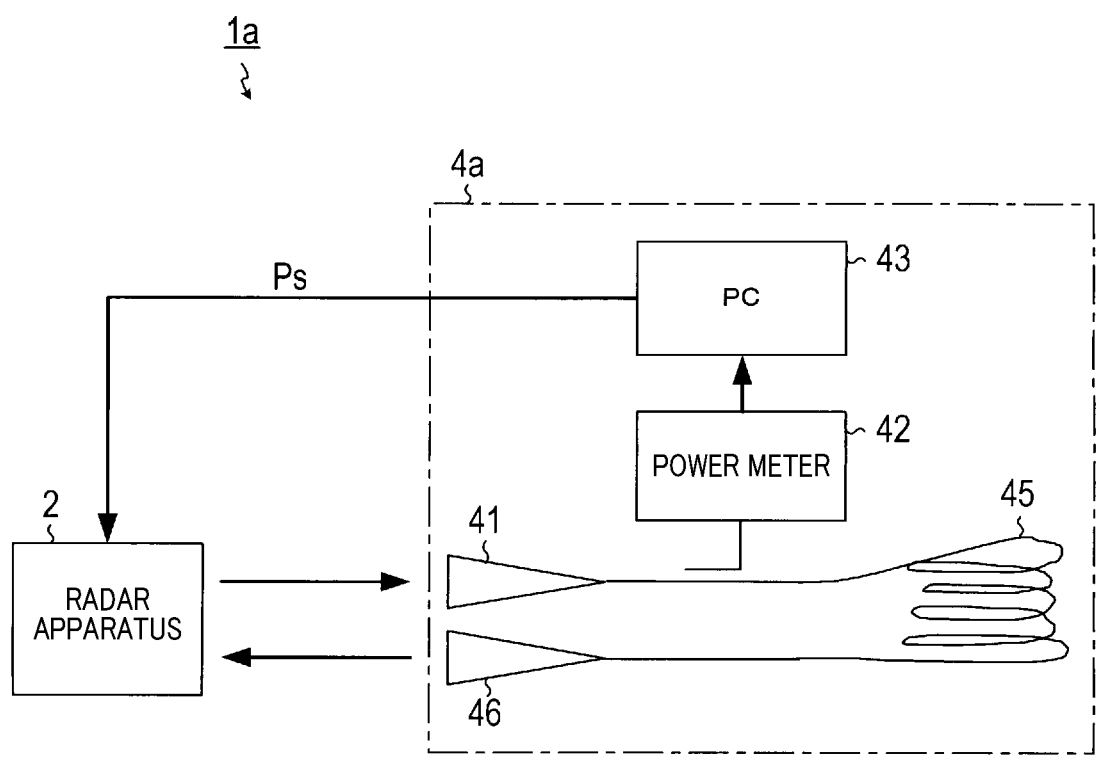
FIG. 5 is a block diagram illustrating a configuration of a radar output control system, according to a second embodiment.

In the foregoing first embodiment, the reflector 44 is used as a configuration for sending back a radar wave with a delay. In contrast to this, the second embodiment utilizes a delay line 45 as shown in FIG. 5, which is different from the first embodiment.

[External Unit System]

The present embodiment includes a radar output control system 1a configured by an external unit system 4a. The external unit system 4a includes the receiving antenna 41, the power meter 42, the PC 43, the delay line 45, and a transmitting antenna 46. In other words, when compared with the external unit system 4 of the first embodiment, the external unit system 4a of the second embodiment is omitted with the reflector 44, but instead, provided with the delay line 45 and the transmitting antenna 46.

The delay line 45 delays a signal from the receiving antenna 41 for a predetermined period of time, for supply to the transmitting antenna 46. The transmitting antenna 46 is arranged facing the radar apparatus 2, and re-radiates a radar wave to the radar apparatus 2, as a transmission signal that is the signal delayed by the delay line 45.

Similar to the case of the reflector 44, the delay line 45 is set so as to achieve a delayed amount with which a peak frequency is ensured to appear in a frequency region where the influence of DC noise is sufficiently reduced.

Advantageous Effects

In the radar output control system 1a according to the present embodiment configured as described above, advantageous effects similar to those of the first embodiment can be obtained.

In the radar output control system 1a according to the present embodiment, a delayed amount can be controlled by the delay line 45, and hence the distance between the radar apparatus 2 and the transmitting antenna 46 in the external unit system 4a can be set as desired. Accordingly, when compared with the case of using the reflector 44 in the external unit system 4 of the first embodiment, radar output can be controlled in a much smaller space.

Other Embodiments

The embodiments of the present disclosure have so far been described. However, the present disclosure is not limited to the foregoing embodiments, and can be implemented in various modes.

(1) In the foregoing embodiments, a bias voltage applied to a circuit associated with amplification of the power amplifier 24 is used as the control parameter G However, the control parameter G is not limited to this. Any parameter may be used as the control parameter G as long as the parameter can control power of a radar wave outputted from the transmitting antenna 25.

(2) The function of one component in the foregoing embodiments may be distributed into a plurality of components. Alternatively, functions of a plurality of components of the foregoing embodiments may be integrated into one component. Alternatively, at least part of the configuration of the foregoing embodiments may be replaced by a known configuration having a similar function. Alternatively, part of the configuration of the foregoing embodiments may be omitted. Alternatively, for example, at least part of the configuration of each of the embodiments described above may be added to or replaced by the configuration of another embodiment described above. It should be noted that any mode encompassed by the technical ideas, which are specified by only the wordings recited in the claims, should be an embodiment of the present disclosure.

(3) Besides the radar apparatus 2 and the radar output control systems 1 and 1a described above, the present disclosure may also be implemented in various modes, such as a program for causing a computer to function as the means configuring the radar apparatus 2, a medium that records the program, a radar output control method, and the like.

REFERENCE SIGNS LIST 1, 1a: Radar output control system,
2: Radar apparatus,
4, 4a: External unit system,
21: Oscillator,
22, 28: Amplifier,
23: Branching filter,
24: Power amplifier,
25, 46: Transmitting antenna,
26, 41: Receiving antenna,
27: Mixer,
29: Analog-to-digital converter,
30: Signal processor,
42: Power meter,
44: Reflector,
45: Delay line.

The invention claimed is:

1. A radar apparatus that transmits and receives a radar wave to thereby acquire information on a target object that has reflected the radar wave, comprising:
an initial measurement means for transmitting the radar wave, with a control parameter for use in changing an output of the radar wave being set to a predetermined value, acquiring an initial transmission level from a measurement device that is provided outside the radar apparatus and measures the radar wave, the initial transmission level being a result of measurement of a transmission level of the radar wave, receiving a delayed wave of the radar wave from a delay device that is provided outside the radar apparatus and delays the radar wave to send back the delayed radar wave, and acquiring an initial reception level, which is a result of measurement of a reception level of the delayed wave;
a target setting means for setting a target reception level according to a preset target transmission level, and the initial transmission level and the initial reception level acquired by the initial measurement means; and
a control means for repeating a process until the reception level coincides with the target reception level, the process comprising calculating an update of the control parameter, transmitting the radar wave after update of the control parameter, receiving the delayed wave of the radar wave from the delay device, and measuring the reception level of the delayed wave.

2. The radar apparatus according to claim 1, wherein the target setting means adds a deviation of the initial transmission level relative to the target transmission level to the initial reception level to set the resultant addition value as the target reception level.

3. The radar apparatus according to claim 1, wherein the control parameter is a bias voltage applied to a circuit associated with amplification of a power amplifier that supplies a transmission signal to a transmitting antenna that outputs the radar wave.

4. The radar apparatus according to claim 1, wherein the control means updates the control parameter by using binary search.

5. A radar output control system comprising:
the radar apparatus according to claim 1;
a receiving antenna that receives a radar wave outputted from the radar apparatus;
a measurement device that measures a reception level of the receiving antenna and transmits a result of measurement to the radar apparatus; and
a delay device that delays the radar wave outputted from the radar apparatus and sends the delayed radar wave back to the radar apparatus.

6. The radar output control system according to claim 5, wherein the delay device is a reflector that reflects the radar wave.

7. The radar output control system according to claim 5, wherein the delay device includes:
a delay line that delays a signal received by the receiving antenna, and
a transmitting antenna that transmits a radar wave toward the radar apparatus, as a transmission signal that is the signal delayed by the delay line.

8. A radar output control method performed by a radar apparatus that transmits and receives a radar wave to thereby acquire information on a target object that has reflected the radar wave, comprising steps of:
transmitting the radar wave, with a control parameter for use in changing an output of the radar wave being set to a predetermined value, acquiring an initial transmission level from a measurement device that is provided outside the radar apparatus and measures the radar wave, the initial transmission level being a result of measurement of a transmission level of the radar wave, receiving a delayed wave of the radar wave from a delay device that is provided outside the radar apparatus and delays the radar wave to send back the delayed radar wave, and acquiring an initial reception level which is a result of measurement of a reception level of the delayed wave;
setting a target reception level according to a preset target transmission level, and the initial transmission level and the initial reception level acquired; and
repeating a process until the reception level coincides with the target reception level, the process comprising calculating an update of the control parameter, transmitting the radar wave after update of the control parameter, receiving the delayed wave of the radar wave from the delay device, and measuring the reception level of the delayed wave.

9. A radar apparatus that transmits and receives a radar wave to thereby acquire information on a target object that has reflected the radar wave, comprising:
a memory;
a processor communicable to the memory; and
a set of computer-executable instructions stored on the memory that cause the processor to implement:
transmitting the radar wave, with a control parameter for use in changing an output of the radar wave being set to a predetermined value, acquiring an initial transmission level from a measurement device that is provided outside the radar apparatus and measures the radar wave, the initial transmission level being a result of measurement of a transmission level of the radar wave, receiving a delayed wave of the radar wave from a delay device that is provided outside the radar apparatus and delays the radar wave to send back the delayed radar wave, and acquiring an initial reception level, which is a result of measurement of a reception level of the delayed wave;
setting a target reception level according to a preset target transmission level, and the initial transmission level and the initial reception level acquired; and
repeating a process until the reception level coincides with the target reception level, the process comprising calculating an update of the control parameter, transmitting the radar wave after update of the control parameter, receiving the delayed wave of the radar wave from the delay device, and measuring the reception level of the delayed wave.

* * * * *